June 2, 1970  B. RAY  3,515,377
SEWAGE DISPOSAL SYSTEM
Filed Dec. 18, 1968  2 Sheets-Sheet 2
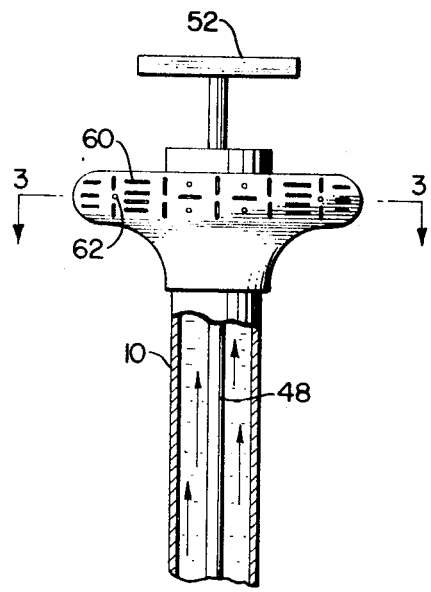
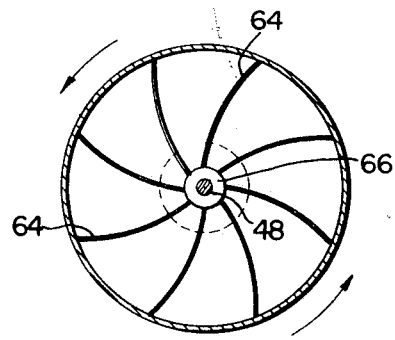
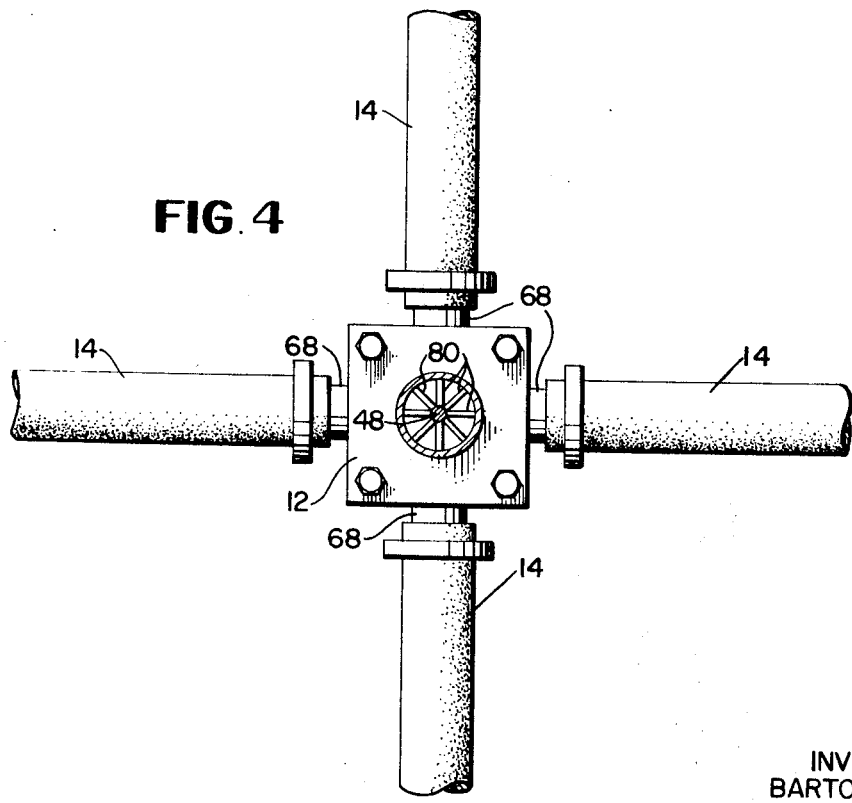
INVENTOR
BARTOW RAY
BY
Plumley, Tyner and Sundt
ATTORNEYS United States Patent Office 3,515,377
Patented June 2, 1970

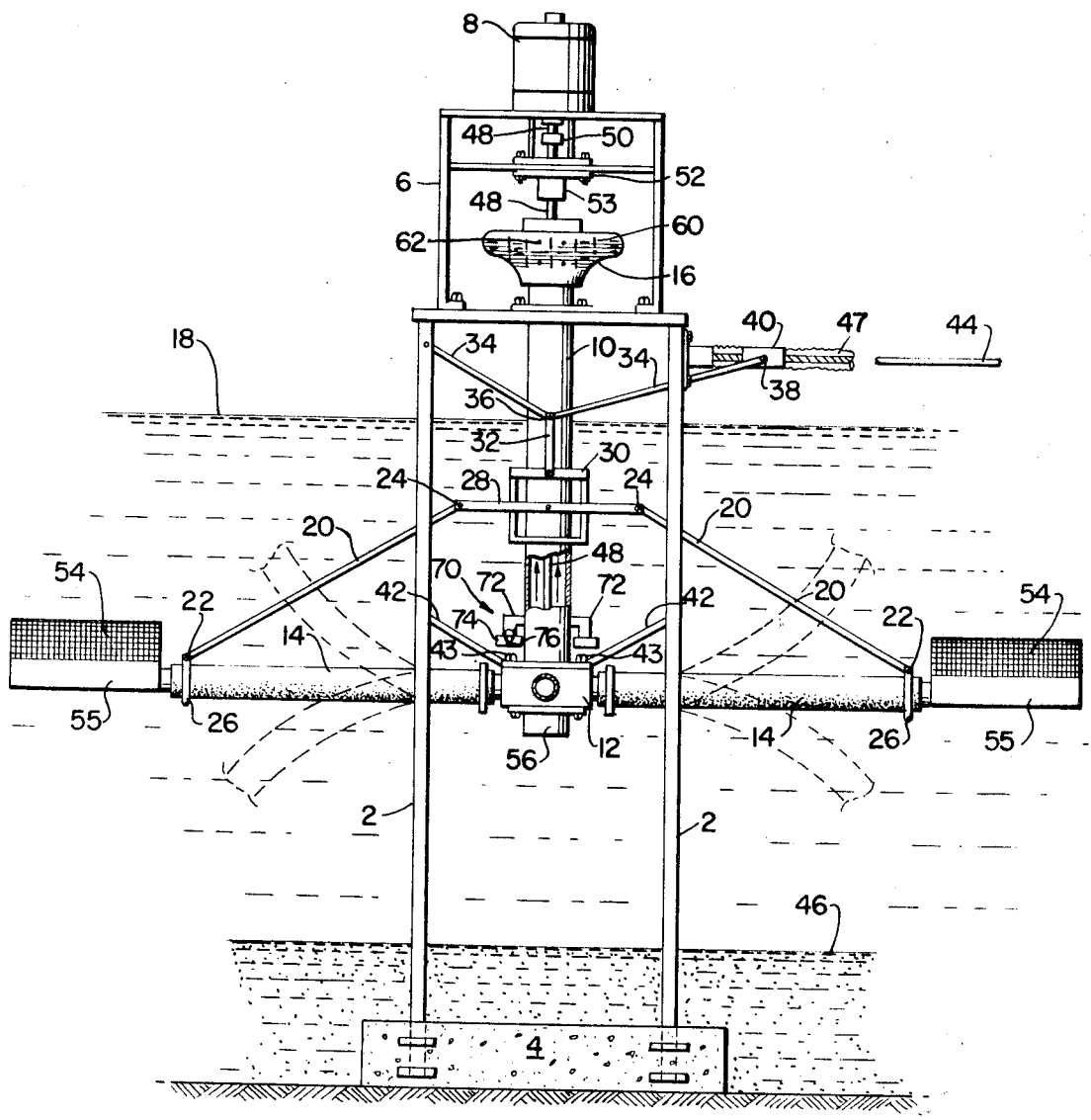
FIG. I

3,515,377
SEWAGE DISPOSAL SYSTEM
Bartow Ray, McLean, Va., assignor to Future Products Development Corporation, McLean, Va., a corporation of Virginia
Filed Dec. 18, 1968, Ser. No. 784,710
Int. Cl. C02b 1/34
U.S. Cl. 261—36          7 Claims

ABSTRACT OF THE DISCLOSURE

A combined aeration and evaporation unit comprising a vertical pipe having at its upper end a rotatable head containing slinger vanes and outlets and a series of flexible intake legs and a pump impeller at its lower end. The pipe is supported by a frame secured to the bottom of a reservoir and a motor is supplied to drive the upper head and lower impeller by means of a common shaft extending through said pipe, thereby drawing water into the pipe through the flexible intake legs, up through the pipe, into the rotatable head and out of said head through a series of aligned outlets.

This invention relates to sewage disposal systems, more particularly to systems used to break down sewage through an activated sludge oxidation process whereby bacteria convert organic material in the sewage into liquid and gases which are further purified.

Generally, sewage disposal systems utilize the four basic processes of nature to convert solids to gases and/or liquids; those processes are:

(1) Bacterial (described below);
(2) Evaporation—conversion of liquids to readily dispersible vapors by sun, wind, etc.;
(3) Percolation—filtering action achieved by passing through soil and porous strata;
(4) Transpiration—conversion of organic material in soil to vapors by plants.

It is a common effort in most sewage disposal systems to utilize one or more of the four natural processes, but as will be apparent, the most difficult to control is the bacterial conversion process.

In sewage disposal systems, the active bacteria are classified by their oxygen requirements. There are three major classifications of bacteria, as follows:

(1) The aerobic group which require dissolved oxygen for their existence;
(2) The anaerobic group which exist even without dissolved oxygen since they obtain oxygen from nitrates, sulfates, and other organic compounds in the sewage; and
(3) The faculative group which can be either aerobic or anaerobic depending on which predominates in a given system.

In treating sewage systems, a faculative group comprising the aerobic group is the most desirable because their activity can be stimulated mechanically by aerator units which oxygenate the liquid sewage. Additionally, the aerobic group does not emit objectionable odors during the process of the sewage treatment. The mechanical stimulation of the aerobic group is achieved by exposing the liquid to a source of oxygen, for example oxygen in the atmosphere, thereby causing the liquid to absorb oxygen from the source.

Anaerobic digestion occurs in the sludge or sediment which collects at the bottom of the reservoir. During anaerobic digestion, that is digestion by bacteria which do not require dissolved oxygen, bases such as methane hydrogen, ammonia, and hyodrogen sulfide, as well as organic acids are formed. These derivatives, particularly ammonia, hydrogen sulfide, and the organics acids, have objectionable odors; however, they are water-soluble and, as they rise from the bottom of the reservoir, they are trapped in the liquid at the top of the sewage system. The trapping can be facilitated by agitation which activates the aerobic bacteria since gently rotating the surface water traps the gases which will remain for aerobic decomposition. Methane and hydrogen are insoluble in water and will rise and drift into the atmosphere; however, these gases are odorless and do not present a practical problem.

Known sewage disposal systems comprise a reservoir for the sewage wherein settling takes effect, thereby causing heavier particles to settle to the floor of the reservoir while leaving the liquid and dissolved organic material at the upper portion available for aeration to stimulate the aerobic bacteria. After this initial purification wherein some natural evaporation occurs, the liquid is processed in various ways (e.g. treatment plants employing chemical treatments) to further purify the liquid before it is discharged into natural bodies of water.

In the past, sewage disposal systems generally have promoted aerobic activity by using aerators which comprise a vertical pipe fixed in the sewage system reservoir, which pipe contains one or more impellers along its vertical length. The liquid is drawn up through the pipe by means of the impellers and is cast into the atmosphere in the form of a thin film wherein the oxygenation necessary for aerobic digestion is promoted.

Fixed devices are unsuitable for general use since by being fixed the liquid to be oxygenated is drawn from a single fixed point or points. That point is also limited since the static head on a vertical column of water makes the units operate unsatisfactorily over pipe heights of approximately 4–5 feet. Thus, in order to raise a column of water over 5 feet, particularly in a sewage system, the pump required makes the system expensive to operate and subject to numerous mechanical failures. Reservoirs are generally maintained at depths of 5 feet so that fixed pipes have difficulty in raising the liquid above the surface of the reservoir for oxygenation.

A recent development in the field of aeration units for sewage systems comprises a series of units adapted for surface agitation and aeration wherein an impeller sits on the surface of the sewage and draws liquid by means of a pump inpeller up through the liquid surface and sprays it in a thin film into the air. These units generally are not adjustable vertically and are thus limited in the types of reservoir which they may service. They do not adequately oxygenate liquid below the surface. These surface units are designed particularly to break up the surface film of reservoirs which they may service. They do not adeprises, as noted above, a relatively viscous lower portion containing organic solid material which has settled out and an upper liquid portion which contains dissolved and collodial-size organic material. The surface units promote agitation and aeration of only the upper liquid portion and do not reach lower levels of liquid.

The purpose of aeration units which break up the liquid surface is to saturate the liquid below the surface and then diffuse oxygen to the entrained particles to promote thorough aeration. These units, while effectively aerating the portion of the sewage at the upper range near the surface level of the liquid, do not effectively treat those portions of the lower levels intermediate the surface and the sludge layer at the bottom. This fact limits their use to shallow reservoirs, thus requiring large surface areas in the reservoirs.

In view of the increasing amount of sewage and the tremendous increase in volume handled by existing sewage systems, it is necessary to continuously provide new aeration units and to provide systems adapted to handle varying capacity reservoirs.

In order to provide an improved sewage system, it is a primary object of the present invention to provide a combined aerator and evaporator unit adapted to purify sewage by stimulating natural processes and avoiding costly use of chemicals and filtration plants.

Another object is to provide an improved system of disposing of sewage without liquid runoff into natural bodies of water, thereby avoiding pollution of natural bodies of water through the more effective use of aeration and evaporation.

It is more a particular object of the present invention to provide a sewage disposal system which combines the operations of aeration and evaporation of a unit adapted to treat sewage reservoirs of varying volume.

Still another object is to provide a novel aeration and evaporation unit adapted to more effectively promote aeration of the entire body of sewage liquid while simultaneously agitating the surface of the liquid to dissolve decomposition gases having objectionable odors.

Another object of the invention is to provide an aeration unit which promotes evaporation by spraying liquid in a plurality of trajectories.

Another object is to provide a vertically adjustable aeration and evaporation unit which can operate in liquid reservoirs up to and over 5 feet in depth.

Still another object is to provide the subject unit which can thoroughly aerate liquid throughout the depth of the reservoir.

Another object is to provide a sewage disposal unit which permits drain-back of liquid, thereby avoiding freezing of the unit, while the unit is not in operation.

It is a general object of the invention to provide a sewage disposal system which is economical, durable, and of varying capacity.

These and other objects of the invention are achieved according to the invention by the provision of a combined aeration and evaporation unit comprising a vertical pipe with adjustable intake points arranged on a frame which may be secured to the bottom of the sewage reservoir. Liquid flows into the pipe through a series of flexible intake legs having filtered inlets; a rotatable head with slinger vanes is provided at the upper end to propel liquid outwardly. As the liquid flows out of this head, it exits through a plurality of aligned outlets and forms many thin films to effectively evaporate and aerate the liquid. The upper head is provided in the form of a revolving casing having a series of holes and slots providing outlets for the liquid. A lower impeller draws liquid through the intake legs and forces it up the vertical pipe. Both the upper head and lower pump impeller are driven by a common motor shaft. The intake legs are vertically adjustable by means of a control unit attached to the frame.

The invention may be better understood by reference to the figures wherein FIG. 1 is a perspective view partly in section showing the novel sewage disposal unit of the present invention.

FIG. 2 is a partial view showing the upper head of the unit of FIG. 1.

FIG. 3 is a sectional view along lines 3—3 of FIG. 2.

FIG. 4 is a partial view showing the lower section of the unit of FIG. 1.

Referring to the figures and particularly to FIG. 1, the novel sewage aeration and evaporation unit is seen to comprise a frame comprising support posts 2 secured in a suitable base, e.g., a concrete block 4 and having a secondary upper frame 6 supporting a reversible motor 8. Within the frame formed by posts 2, a vertical pipe 10 is provided with a lower portion containing a pump casing 12 containing an impeller and a series of flexible intake legs 14. At the upper portion of the pipe 10, an outlet head 16 is provided which contains slinger vanes and outlets. As seen generally from FIG. 1, the flexible inlet legs 14 draw liquid into the vertical pipe by means of the force provided through the pump impeller in casing 12 and forces the liquid along the hollow pipe into the outlet head 16. The unit is adapted to be supported within a cell or reservoir of sewage at a position wherein the flexible intake legs 14 and the impeller 12 are below the surface of the liquid. The liquid surface is generally shown as 18 in FIG. 1. Of course, this level will vary with the type facility used and in a given facility will vary with the season of the year, the rate of population growth, etc.

The flexible intake legs 14 are adjustable as shown in the dotted positions due to their flexible nature and to a control. The legs 14 are flexible and are formed of a plastic or rubber material or corrugated metal. Vertical adjustment is effected by virtue of hinged links 20 shown between the flexible intake legs and the yoke 30. The adjusting means is formed by pivoted links 20 attached to the intake leg 14 at pivot 22 by means of collar 26. The outer end of the link 20 is attached at a pivot point 24 to a bar 28 securely attached to yoke 30 which is slidable along vertical pipe 10. Attached to yoke 30 is a bar 32 securely attached to flexible links 34. Links 34 are pivoted at a first end at pivot point 36 to link 32 and are pivotally secured at points 38 to the actuator sleeve 40. Bars 42 are secured to support posts 2 at points not shown and to the lower impeller casing 12 by bolts 43. The actuator sleeve shown as 40 is attached to a control lever 44 surrounded by a waterproof protective flexible covering 47 which is attached to one end to post 2 and which contains at its other end an operating handle (not shown). By manipulation of the operating handle, for example, by mechanically or manually turning a knob, lever 44 is caused to move sleeve 40 in the directions shown by arrows in FIG. 1. Movement of sleeve 40 causes link 34 to pivot about point 36 thereby causing vertical movement of bar 32 and consequent movement of yoke 30. As yoke 30 moves in a vertical direction, flexible links 20 pivot at points 22 and 24 to raise or lower intake pipes 14 to the positions shown in dotted lines. By varying the length of legs 14, the amount of adjustability can be varied.

In the manner just described, it is possible to raise or lower the point of intake in accordance with varying operating conditions in the sewage reservoir. By providing the manipulative element attached to lever 44 at a remote position, for example, on the bank of the reservoir, it is possible to remotely control operation of the unit as the liquid lever varies. Also by vertically adjusting the point of intake, much more thorough aeration of the liquid above sludge 46 is achieved, while maintaining agitation of surface 18.

Motor casing 8 is secured upon upper frame 6 and drive shaft 48 is secured by means of coupling 50 to shaft flange 52. Shaft flange 52 is carried in bearing 53 attached to flange 52 and to shaft 48 whereby rotation operates the outlet head 16. Additionally, shaft 48 which continues through the length of vertical pipe 10 into the lower fasing 12 and bearing 56 operates the lower impeller in casing 12. As noted above, operation of the lower impeller in casing 12 draws liquid through pipes 14 into casing 12 wherein the force of the pump continues to force liquid up the length of vertical pipe 10 into outlet casing 16. Outlet casing 16 and the inner slinger vanes rotate as a single unit attached to the shaft 48. A series of outlets are provided in casing 16 which outlets are formed as slots 60 and holes 62 arranged at differing heights as shown in FIG. 1. The varying height arrangement allows liquid to exit from the casing at differing levels, thereby providing in effect a series of thin films arranged at different trajectories. This, in effect, gives a multiple plan or multiple film aeration and evaporation unit. The combined use of holes and slots allows non-interfering films to be formed.

As is further seen from FIG. 1, the intake legs 14 are provided with strainers 54 attached to intake boxes 55. Intake box 55 is a trough-like semicircular part covered by a mating semicircular trough-shaped web 54. This arrangement filters out large solid particles to avoid clogging the unit. If the unit should become clogged with agglomerated sewage particles, a cleaning mechanism is provided in valve 70. Valve 70 comprises an elbow fitting 72 leading from pipe 10 to valve body 74 which contains ball 76. The valve is normally inoperative but to clean the unit motor 8 can be reversed so the impeller in casing 12 draws water in through fitting 72 thereby unseating ball 76. The water is then forced through casing 12 and out of legs 14 to clean the unit.

Referring to FIG. 2, the outlet head 16 is shown in greater detail. Furthermore, in FIG. 3, the internal slinger is seen to comprise a number of integral slinger vanes 64 secured by collar 66 to rotating shaft 48. The normal direction of rotation is shown by the arrows in FIG. 3. The rotation of the slinger vanes entrains liquid within the casing 16 and forces it out through the above-noted outlets 60 and 62. Referring again to FIG. 2, the normal water travel is shown by the direction of the arrows to be upwardly through vertical pipe 10.

Referring to FIG. 4, shaft 48 is seen to be housed in a casing 12 which casing also has inlets for the liquid flow from flexible pipes 14. Pipes 14 are secured to the casing by means of coupling elements 68. Within casing 12 an impeller having impeller vanes 80 is attached to the shaft 48 to provide the driving force which draws in liquid and forces it up the pipe 10 into outlet head 16. By use of the lower impeller, it is possible to reduce the hydrostatic pressure required for the upper slinger to operate and the slinger can serve its primary function which is to force liquid out in a number of different planes. In previous systems wherein a single impeller was used or wherein impellers arranged at different levels were used, this effect was diminished since the upper impeller was required to provide a lifting force. In the present system, pump impeller vanes 80 draw the liquid in and force it out leaving the upper slinger vanes 64 free to serve their slinging function. The lower impeller may effectively operate when the pipe 10 is of a length up to 3 to 6 feet. The lifting of a column of water greater than 6 feet in height requires pumping devices which are inflexible and uneconomical.

Since the slinger head 16 is 3 to 4 feet above the liquid level line, it is necessary to provide the lower impeller in order to have sufficient pressure to overcome the hydrostatic head achieved when head 16 is 3 to 4 feet above the line and impeller 12 is 1½ to 3 feet below the level of liquid. It is necessary to have the upper slinger at such a height in order to achieve the increased diameter of spray on the order of 35 to 75 feet. When legs 14 are in an up position, the power required to pump the liquid up the pipe 10 is reduced due to the water pressure forcing liquid into legs 14.

The unit of the present invention is adapted to draw liquids from points ½ to 4 feet below surface 18 by means of varying the intake leg positions with control 40. The speed of operation is adjustable by varying the speed of the reversible motor 8 and by varying the angle of intake of pipe 14. It is not generally desired to mix or stir the heavy liquid which is formed at levels approximately 1½ feet from the bottom of the reservoir since herein anaerobic bacterial action is taking place and agitation is not desired or necessary. Improved evaporation is achieved by the present invention since the surface area of the liquid is improved by using various planes of spray and since the liquid at lower depths is generally warmer than that at higher depths so that drawing the liquid from levels above 1½ feet increases heat transfer when the liquid is sprayed onto the surface of the liquid. This is particularly relevant in areas which experience cold temperatures since it prevents ice forming on the surface areas. An electrical heating system may be installed in vertical pipe 10 to heat the liquid, and thus increases evaporation in these areas and improves heat transfer.

By using the slinger head 16 with integral vanes 64, it is possible to allow liquid to drain back into the pond along pipe 10 to avoid freezing of the unit when not operating in cold areas.

The invention should not be limited by specific dimensions, but for purposes of exemplification, it may be stated that 6 units each having a ½ H.P. motor and a vertical pipe length of 3 to 6 feet and legs 3 feet long will adequately service an installation serving 400 persons with average industrial and commercial facilities. By use of these units, the reservoir size can be reduced 25% since it has been found that a pond size of only ¾ acre at 5 feet depth is required as compared to conventional aeration systems for such a facility which require one acre reservoir at 5 feet depth. If a larger city or facility is encountered, plural units of this invention can be arranged for parallel operation to service the increased load, and the depth of the reservoir can be increased to meet the load.

The materials of construction may suitably be non-corrosive metal such as copper or stainless steel, except for legs 14 which may be vinyl-type plastics.

The motor can be a standard AC or DC motor which is reversible and which has 2 operation speeds, e.g., 1150 and 1750 r.p.m. Varying the motor speed varies the capacity of the aerator-evaporator.

Although the invention has been described in considerable detail with reference to certain preferred embodiments thereof, it will be understood that variations and modifications can be effected within the spirit and scope of the invention as described above and as defined in the appended claims.

I claim:

1. An apparatus for aerating and evaporating a liquid which comprises a frame, a hollow pipe mounted on said frame, at least one flexible intake leg mounted on said pipe, means to move said leg in a generally vertical direction, a rotatable shaft extending through said pipe, means to rotate said shaft, an impeller mounted on said shaft adjacent to the lower end of said pipe, and a slinger mounted on said shaft adjacent to the upper end of said pipe whereby said apparatus, when placed in a liquid, will transmit said liquid from said leg, through said impeller, said pipe, and said slinger.

2. Apparatus of claim 1 wherein said slinger comprises a rotatable casing with internal vanes and a plurality of outlets at different vertical levels.

3. Apparatus of claim 1 wherein said frame is securely attached to a liquid reservoir.

4. Apparatus of claim 1 wherein said means to move the leg comprises a series of pivoted links secured to said frame and to said leg, said links being pivotably connected to operating means.

5. Apparatus of claim 1 further comprising means to reverse flow of liquid through said leg.

6. Apparatus of claim 1 wherein said intake leg is of vinyl material and is provided with strainer means at its extremity.

7. Apparatus of claim 1 wherein said unit is mounted with said impeller below the liquid level and the slinger above the liquid level.

References Cited

UNITED STATES PATENTS

| | | | |
|---|---|---|---|
| 2,054,395 | 9/1936 | Streander | 261—88 X |
| 2,404,701 | 7/1946 | Felsecker | 210—197 |
| 2,825,541 | 3/1958 | Moll et al. | 261—29 |
| 3,246,882 | 4/1966 | Clough | 261—91 X |
| 3,320,160 | 5/1967 | Welles et al. | |

TIM R. MILES, Primary Examiner

U.S. Cl. X.R.

261—88, 91; 210—219

UNITED STATES PATENT OFFICE
CERTIFICATE OF CORRECTION

Patent No. 3,515,377      Dated June 2, 1970

Inventor(s) Bartow Ray

It is certified that error appears in the above-identified patent and that said Letters Patent are hereby corrected as shown below:

| Column | Line | Error |
|---|---|---|
| 1 | 73 | "hyodrogen" should read ---hydrogen--- |
| 2 | 53-54 | "of reservoirs which they may service. They do not adeprises," should read ---of the sewage liquid. The sewage liquid generally comprises,--- |
| 4 | 57 | "fasing" should read ---casing--- |

SIGNED AND
SEALED
OCT 20 1970

(SEAL)
Attest:

Edward M. Fletcher, Jr.
Attesting Officer

WILLIAM E. SCHUYLER, JR.
Commissioner of Patents

FORM PO-1050 (10-69)